(12) United States Patent
Roquelaure (10) Patent No.: US 8,127,120 B2
(45) Date of Patent: Feb. 28, 2012

(54) SECURED PROCESSING UNIT

(75) Inventor: Philippe Roquelaure, Bouc Bel Air (FR)

(73) Assignee: STMicroelectronics SA, Montrouge (FR)

( * ) Notice: Subject to any disclaimer, the term of this patent is extended or adjusted under 35 U.S.C. 154(b) by 927 days.

(21) Appl. No.: 12/108,443

(22) Filed: Apr. 23, 2008

(65) Prior Publication Data

US 2009/0327672 A1 Dec. 31, 2009

(30) Foreign Application Priority Data

Apr. 23, 2007 (FR) .................................... 07 02913

(51) Int. Cl.
*G06F 9/00* (2006.01)
*G06F 9/40* (2006.01)
*G06F 9/44* (2006.01)

(52) U.S. Cl. ........ 712/243; 712/205; 712/214; 712/234; 712/244

(58) Field of Classification Search .................. 712/205, 712/214, 234, 244, 245, 243
See application file for complete search history.

(56) References Cited

U.S. PATENT DOCUMENTS 4,513,393 A * 4/1985 Edlund et al. ..................... 710/5
(Continued)

FOREIGN PATENT DOCUMENTS

EP 0 735 488 10/1996
(Continued)

OTHER PUBLICATIONS

Arora, Divya; Ravi, Srivaths; Raghunathan, Anand; and Jha, Niraj. "Secure Embedded Processing through Hardware-assisted Run-time Monitoring". 2005. IEEE. Proceedings of the Design, Automation and Test in Europe Conference and Exhibition (Date '05). pp. 1-6.*

(Continued)

*Primary Examiner* — Aimee Li
(74) *Attorney, Agent, or Firm* — Seed IP Law Group PLLC (57) ABSTRACT

A method for executing by a processing unit a program stored in a memory, includes: detecting a piece of information during the execution of the program by the processing unit, and if the information is detected, triggering the execution of a hidden subprogram by the processing unit. The method may be applied to the securization of an integrated circuit.

37 Claims, 4 Drawing Sheets

U.S. PATENT DOCUMENTS

| | | | | |
|---|---|---|---|---|
| 5,295,080 A * | 3/1994 | Averill | | 714/719 |
| 5,418,917 A * | 5/1995 | Hiraoka et al. | | 712/234 |
| 5,684,983 A * | 11/1997 | Ando | | 712/225 |
| 6,971,004 B1 | 11/2005 | Pleis et al. | | 713/100 |
| 7,117,284 B2 * | 10/2006 | Watt et al. | | 710/261 |
| 7,124,274 B2 * | 10/2006 | Watt et al. | | 711/202 |
| 7,127,594 B2 * | 10/2006 | Sasagawa | | 712/229 |
| 7,149,862 B2 * | 12/2006 | Tune et al. | | 711/163 |
| 7,171,539 B2 * | 1/2007 | Mansell et al. | | 711/203 |
| 7,185,159 B2 * | 2/2007 | Beinet et al. | | 711/163 |
| 7,231,476 B2 * | 6/2007 | Watt et al. | | 710/200 |
| 7,383,445 B2 * | 6/2008 | Tomohiro | | 713/193 |
| 7,523,279 B2 * | 4/2009 | Nanki et al. | | 711/163 |
| 2004/0105298 A1 * | 6/2004 | Symes | | 365/149 |
| 2004/0139346 A1 * | 7/2004 | Watt et al. | | 713/200 |
| 2004/0143714 A1 * | 7/2004 | Watt | | 711/163 |
| 2004/0148480 A1 * | 7/2004 | Watt et al. | | 711/163 |
| 2004/0153593 A1 * | 8/2004 | Watt et al. | | 710/200 |
| 2004/0153672 A1 * | 8/2004 | Watt et al. | | 713/201 |
| 2004/0153807 A1 * | 8/2004 | Watt et al. | | 714/35 |
| 2004/0162993 A1 | 8/2004 | Teglia | | 713/200 |
| 2004/0187019 A1 * | 9/2004 | Nanki et al. | | 713/200 |
| 2004/0250092 A1 * | 12/2004 | Hori et al. | | 713/189 |
| 2005/0091516 A1 | 4/2005 | Mcdermott | | 713/189 |
| 2005/0257016 A1 * | 11/2005 | Boles et al. | | 711/163 |
| 2008/0065907 A1 * | 3/2008 | Nutter et al. | | 713/193 |
| 2008/0066074 A1 * | 3/2008 | Nutter et al. | | 718/107 |

FOREIGN PATENT DOCUMENTS

WO      02/50641      6/2002

OTHER PUBLICATIONS

Arora, Divya; Ravi, Srivaths; Raghunathan, Anand; and Jha, Niraj. "Hardware-Assisted Run-Time Monitoring for Secure Program Execution on Embedded Processors". Dec. 2006. IEEE. IEEE Transactions on Very Large Scale Integration (VLSI) Systems, vol. 14, No. 12. pp. 1295-1308.*

* cited by examiner

SECURED PROCESSING UNIT

TECHNICAL FIELD

The present disclosure generally relates to the protection of integrated circuits, and particularly but not exclusively those present in integrated circuit cards such as smart cards.

The present disclosure relates more particularly but not exclusively to a method for protecting the program executed by a processing unit of an integrated circuit against attacks aiming to extract confidential data stored by the integrated circuit.

BACKGROUND INFORMATION

Secured integrated circuits store confidential data which must remain inaccessible to the end user. Such confidential data may comprise encryption keys, or more generally data protection keys, and data or executable code enabling such keys to be generated or memory-accessed.

Despite all the protections provided in secured integrated circuits, it is still possible to extract the executable code stored by the integrated circuit, by taking advantage of uncontrolled weaknesses thereof. The executable code thus extracted can then be analyzed and/or executed by a compatible but non-protected processor. By having the extracted executable code executed by the unprotected compatible processor, it is possible to access all the data transiting between the processing unit and the memory, including the protection keys.

Certain secured integrated circuits such as those incorporated into smart cards, have a coprocessor to perform "sensitive" calculations, particularly cryptographic calculations handling secret keys. The result is that the coprocessor of such an integrated circuit is mainly targeted by the attacks aiming to discover the secret data handled. Certain attacks, particularly those causing errors in the operation of the coprocessor, are particularly efficient.

Furthermore, the introduction of such a coprocessor into an integrated circuit is not very desirable as it contributes to increasing the complexity of the integrated circuit and therefore the cost thereof.

BRIEF SUMMARY

One embodiment provides a hidden subprogram in the program executed by the processing unit of the integrated circuit, and triggers the execution of the hidden subprogram following the detection, during the execution of the program, of an event distinct from the appearance of an instruction for calling the subprogram.

More particularly, one embodiment relates to a method for executing by a processing unit a program stored in a memory. According to one embodiment, the method comprises detecting a piece of information during the execution of the program by the processing unit, and if the information is detected, triggering the execution of a hidden subprogram by the processing unit.

According to one embodiment, the triggering information for triggering the hidden subprogram is a datum circulating on a bus.

According to one embodiment, the triggering information can be modified by the processing unit.

According to one embodiment, the hidden subprogram can be modified by the processing unit.

According to one embodiment, the triggering information is sent by the processing unit in an enciphered form, is deciphered, and is then stored in a register, the content of the register being compared upon each read of an instruction in the memory.

According to one embodiment, the hidden subprogram is transmitted by the processing unit in an enciphered form, is deciphered, and then stored for execution by the processing unit.

According to one embodiment, the hidden subprogram is transmitted by the processing unit in an enciphered form, then stored for execution by the processing unit, and deciphered when it is executed.

According to one embodiment, the triggering information and the hidden subprogram are deciphered in different ways.

According to one embodiment, the hidden subprogram is stored in internal registers.

According to one embodiment, the hidden subprogram is stored in the memory.

According to one embodiment, the triggering information is a read address for reading the memory sent by the processing unit.

According to one embodiment, the triggering information belongs to the set of instructions executable by the processing unit.

According to one embodiment, the instruction read in the memory and which corresponds to the triggering information is executed before or after the hidden subprogram.

According to one embodiment, the method comprises keeping a program pointer at a value unchanged during the execution of the hidden subprogram.

One embodiment also relates to an integrated circuit comprising a processing unit linked to a memory and configured for reading and executing each instruction of a program stored in the memory.

According to one embodiment, the integrated circuit comprises a sequencing module configured for detecting a piece of information during the execution of the program by the processing unit, and if the information is detected, triggering the execution of a hidden subprogram by the processing unit.

According to one embodiment, the triggering information for triggering the hidden subprogram is a datum circulating on a bus.

According to one embodiment, the sequencing module comprises a register for storing the triggering information that can be modified by the processing unit.

According to one embodiment, the sequencing module comprises a set of registers storing the hidden subprogram.

According to one embodiment, the sequencing module is configured for reading the hidden subprogram in the memory.

According to one embodiment, the triggering information is a read address for reading the memory sent by the processing unit.

According to one embodiment, the triggering information belongs to the set of instructions executable by the processing unit.

According to one embodiment, the sequencing module is configured for deciphering the triggering information received from the processing unit and storing it in a register in a deciphered form.

According to one embodiment, the sequencing module is configured for deciphering the hidden subprogram received from the processing unit and storing the subprogram in a deciphered form.

According to one embodiment, the sequencing module is configured for deciphering the triggering information and the hidden subprogram in different ways.

According to one embodiment, the sequencing module is configured for deciphering each instruction of the hidden subprogram stored in an enciphered form before transmitting it to the processing unit for execution.

According to one embodiment, the triggering information belongs to the set of instructions executable by the processing unit.

According to one embodiment, the sequencing module is configured for transmitting to the processing unit the intercepted instruction which corresponds to the triggering information before or after the instructions of the hidden subprogram.

According to one embodiment, the processing unit is configured for keeping a program pointer at a value unchanged during the execution of the hidden subprogram.

According to one embodiment, the integrated circuit comprises several sequencing modules to execute several hidden subprograms.

BRIEF DESCRIPTION OF THE SEVERAL VIEWS OF THE DRAWINGS

These and other features shall be presented in greater detail in the following description of one or more embodiments, given in relation with, but not limited to the following figures, in which.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

In the figures, only the elements necessary for the understanding of the embodiment(s) have been represented for the sake of clarity.

Figure 1:
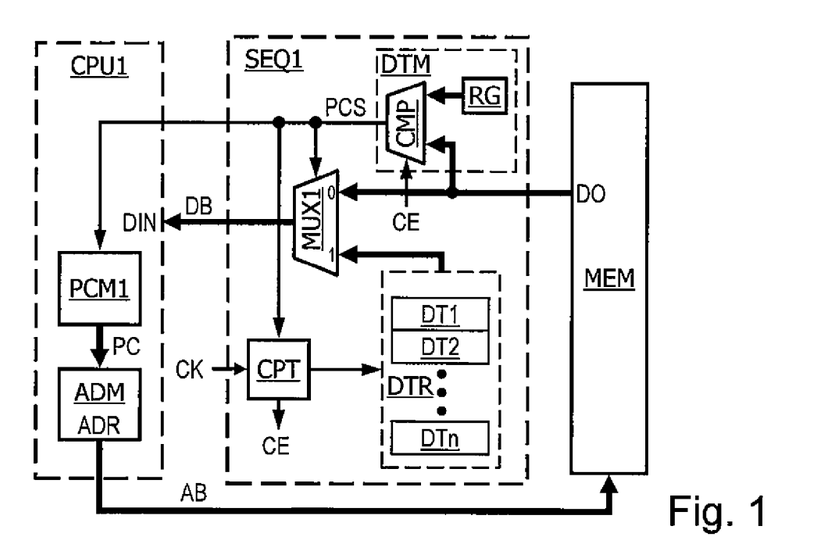
FIG. 1 represents in block form a first embodiment of an integrated circuit.

FIG. 1 represents an integrated circuit according to a first embodiment. In FIG. 1, the integrated circuit comprises a processing unit CPU1 linked to a memory MEM through a sequencer SEQ1 according to a first embodiment.

The processing unit CPU1 comprises a program pointer management module PCM1, an address management module ADM, and a data input DIN coupled to a data bus DB. The module PCM1 supplies the module ADM with the value of a program pointer PC. The module ADM comprises an address output ADR coupled to an address bus AB.

The memory MEM comprises an address input coupled to the address bus AB and a data output DO that, instead of being coupled to the data bus DB as in prior art integrated circuits, is linked to the data bus through the sequencer SEQ1.

The sequencer SEQ1 comprises a multiplexer MUX1, a detection module DTM, a set of registers DTR (for example a bank of registers) and a counter CPT. The multiplexer MUX1 is coupled at output to the data bus DB and at input to the data output DO of the memory MEM. Another input of the multiplexer MUX1 is coupled to an output of the set of registers DTR. The detection module DTM is coupled to the output DO of the memory MEM and supplies a signal PCS that is sent to a control input of the multiplexer MUX1, to an input for triggering the counter CPT, and to an input of the program pointer management module PCM1.

The counter CPT is paced by a clock signal CK to thus successively address each of the registers DT1, DT2, ... DTn of the set of registers DTR. The clock signal CK can be the one that also paces the reading of the memory MEM by the unit CPU1.

When the signal PCS is on 0, the multiplexer MUX1 sends on the data bus DB to the unit CPU1, the word read in the memory MEM at the address supplied by the bus AB. When the signal PCS is on 1, the content of the register DT1, DT2, ... DTn addressed by the counter CPT is sent on the bus DB, instead of a word read in the memory.

Figure 2:
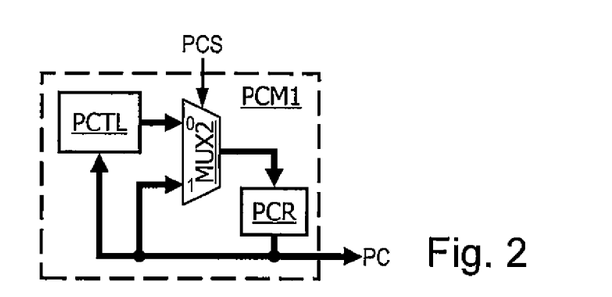
FIG. 2 represents in block form a management module for managing a program pointer of the integrated circuit in FIG. 1 according to one embodiment.

FIG. 2 represents the program pointer management module PCM1 of one embodiment. The module PCM1 comprises a multiplexer MUX2, a control module PCTL and a register PCR storing the value of the program pointer PC. An output of the module PCTL is coupled to an input of the multiplexer MUX2. The output of the multiplexer MUX2 is coupled to an input of the register PCR. The value of the program pointer PC stored in the register PCR is sent to another input of the multiplexer MUX2 and to an input of the module PCTL. The multiplexer MUX2 is controlled by the signal PCS coming from the module DTM. When the signal PCS is on 0, the multiplexer MUX2 sends the value of the program pointer at output of the module PCTL in the register PCR. When the signal PCS is on 1, the multiplexer keeps the content of the register PCR unchanged.

The module PCTL groups together the classic functions of managing the program pointer of a processing unit, e.g., the functions of incrementing and modifying the value of the program pointer according to the instructions to be executed, depending on whether or not they leave the value of the program pointer unchanged, such as jump, subprogram calling and end of subprogram return instructions.

Figure 9:
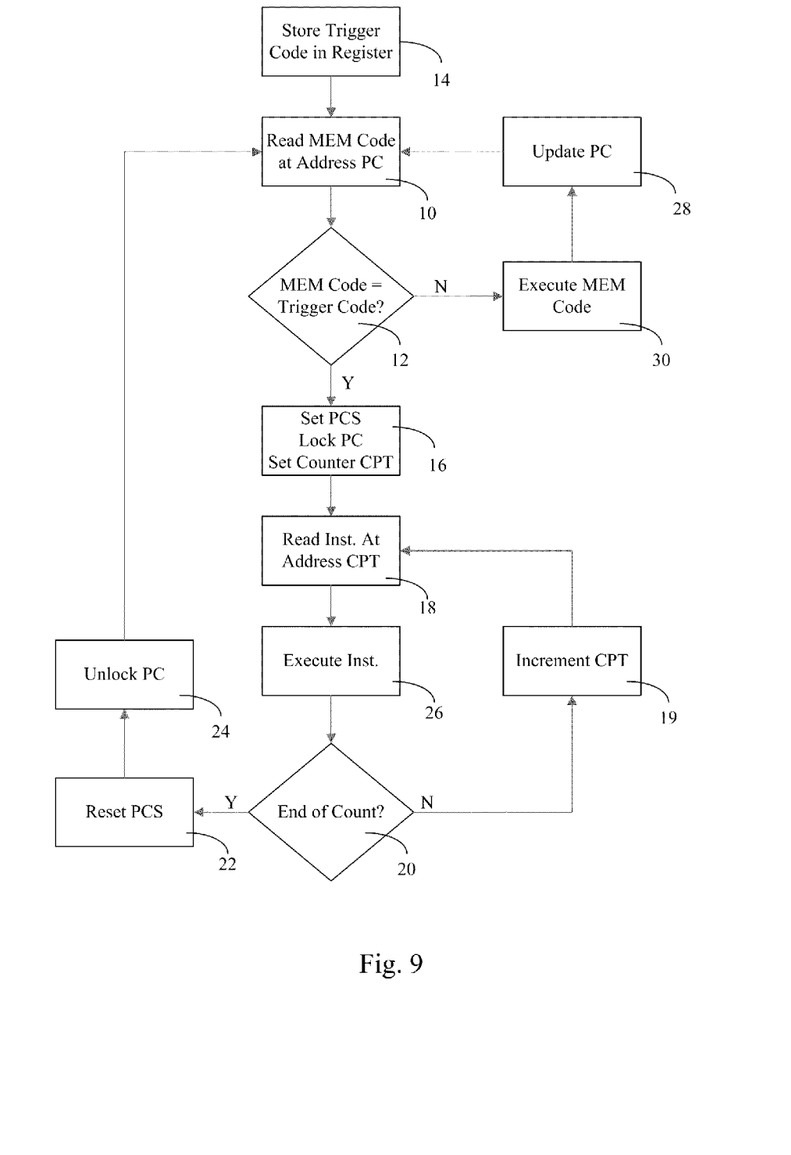
FIG. 9 is a flowchart of a method according to one embodiment.

The detection module DTM is designed to detect a specific code read, in step 10 of FIG. 9, in the memory MEM at the address indicated by the program pointer PC. The module DTM comprises for example a comparator CMP for comparing, in step 12, the content of a register RG (stored in step 14) with the code at output DO of the memory MEM. If the content of the register RG is equal to the code read in the memory, the signal PCS at output of the comparator CMP changes to 1 in step 16. When the signal PCS changes to 1, the counter CPT is set (step 16 and triggered to select the first register DT1 of the set of registers DTR. The multiplexer MUX1 applies the value read in the selected register of the set of registers DTR (step 18) on the data bus DB. Thus, the instruction code read by the processing unit in the memory MEM is replaced by the value of the first register DT1. Upon the next clock count (step 19), the value of the second register DT2 is read (step 18) and sent on the data bus DB, and so on and so forth. At the end of counting (step 20), when the last register DTn is addressed, the counter CPT sends an end-of-counting signal CE which is sent to the detection module DTM. Upon receiving the signal CE, the comparator CMP of the module DTM is set to put the signal PCS on 0 (step 22). The module PCM1 then unlocks the program pointer PC (step 24) which is again incremented to read the next instruction code in the memory MEM.

Figure 3:
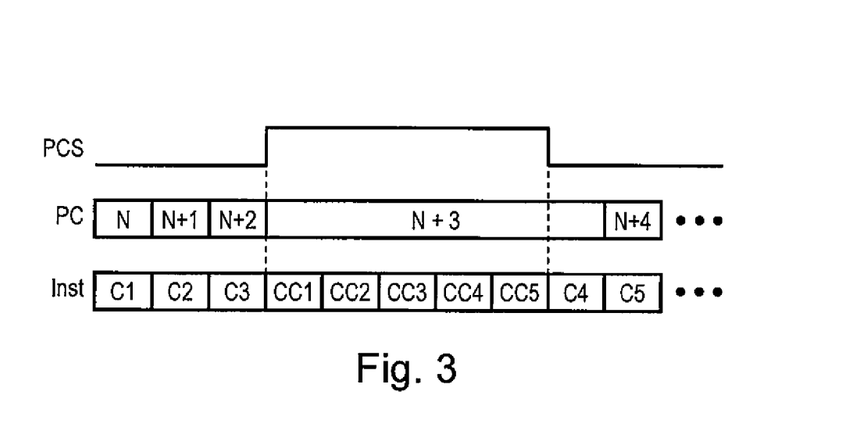
FIG. 3 shows in the form of timing diagrams, the operation of the integrated circuit represented in FIG. 1 according to one embodiment.

FIG. 3 shows in the form of timing diagrams the operation of one embodiment of the integrated circuit when the number of registers in the set of registers DTR is equal to 5. FIG. 3 represents the shape of the signal PCS, the successive values of the program pointer PC and the successive values of the instruction code Inst transmitted to the unit CPU1 by the data bus DB.

The signal PCS is first of all on 0, while the program pointer takes the successive values N, N+1, N+2, and the instruction codes read in the memory MEM are successively C1, C2, C3 (step 10 of FIG. 9). The module DTM detects, in step 12, that the code C3 corresponds to a code triggering the sequencer SEQ1 stored in the register RG in step 14. The signal PCS then changes to 1, which locks the value of the program pointer PC stored in the register PCR on N+3 (step 16). The instructions CC1-CC5 of a hidden subprogram stored in the set of registers DTR are then successively read and transmitted to the unit CPU1 (step 26). At the end of the reading of the last register DTn of the set of registers DTR (step 20), the signal PCS changes back to 0 (step 22), which triggers the reading of the address N+3 in the memory MEM (step 10), i.e., the address that should have been read if the module DTM had not detected any triggering code. Upon the next read cycle, the module PCTL calculates the value of the program pointer PC (step 28) according to the instruction to be executed in step 30. In the example in FIG. 3, the program pointer changes to the value N+4 (step 24). During these two read cycles, the instruction codes C4, C5 which follow the instruction code C3 are then read in the memory MEM.

As a result of these provisions, the unit CPU1 executes a subprogram which does not appear in the memory MEM, when a specific instruction code stored in the register RG is read in the memory. It will be understood that this specific code is distinct from the subprogram calling instruction. Thus, if the executable code is extracted fraudulently from the memory MEM, it will not be executable by a compatible but non-secured processor, as the processor will not perform the jump to the hidden subprogram stored by the sequencer SEQ1 and does not have access to this subprogram.

The instruction code C3 (stored in the register RG) which triggers the sequencer SEQ1, may belong to the set of instructions of the secured processor comprising the unit CPU1, so as not to be easily located. The execution by the non-secured processor of this instruction code will not trigger the execution of the hidden subprogram stored in the set of registers, and could, depending on the selected value of the triggering code, generate an execution error.

Figure 4:
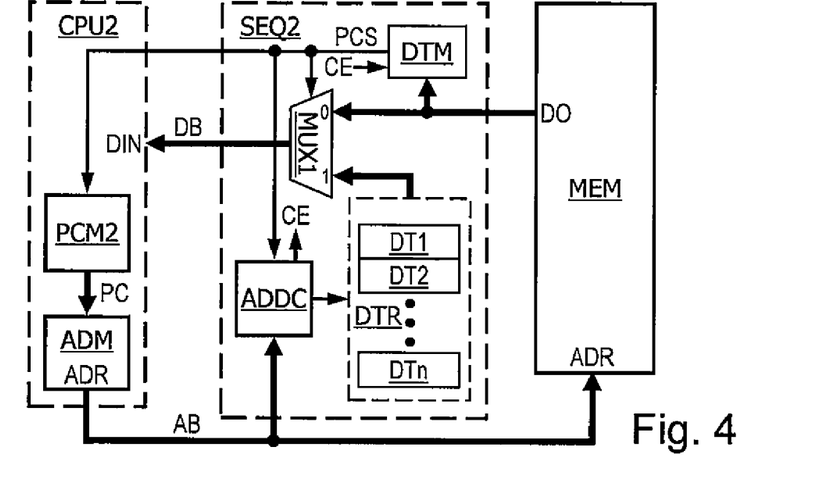
FIG. 4 represents in block form a second embodiment of an integrated circuit.

FIG. 4 represents another embodiment of an integrated circuit. The elements previously described are associated with the same references in FIG. 4. In FIG. 4, the integrated circuit comprises a processing unit CPU2 and a sequencer SEQ2 coupled between the processing unit CPU2 and a memory MEM. The sequencer SEQ2 is substantially identical to the sequencer SEQ1 in FIG. 1 except that the counter CPT is replaced in the sequencer SEQ2 by an address decoder ADDC which addresses the set of registers DTR according to the address transmitted on the address bus AB by the processing unit. The processing unit CPU2 comprises a program pointer management module PCM2 supplying the address management module ADM with the program pointer PC.

Figure 5:
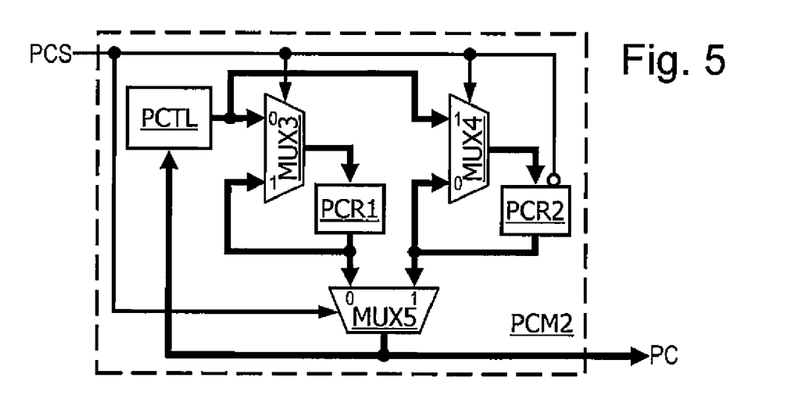
FIG. 5 represents in block form a management module for managing a program pointer of the integrated circuit in FIG. 4 according to one embodiment.

FIG. 5 represents the program pointer management module PCM2 of one embodiment. The module PCM2 comprises the control module PCTL previously described, three multiplexers MUX3, MUX4, MUX5, and two registers PCR1, PCR2 for storing a value of the program pointer PC. A program pointer output of the module PCTL is coupled to an input of the multiplexer MUX3 and an input of the multiplexer MUX4. The output of the multiplexer MUX3 is coupled to the input of the register PCR1. The output of the register PCR1 is coupled to an input of the multiplexer MUX3 and to an input of the multiplexer MUX5. The output of the multiplexer MUX4 is coupled to the input of the register PCR2. The output of the register PCR2 is coupled to another input of the multiplexer MUX4 and to another input of the multiplexer MUX5. The output of the multiplexer MUX5 supplies the value of the program pointer PC at output of the module PCM2 and to an input of the module PCTL. The registers MUX3, MUX4 and MUX5 are controlled by the signal PCS supplied by the detection module DTM for detecting the sequencer SEQ2. When the signal PCS is on 0, the register PCR2 is set to 1, the multiplexer MUX3 sends the output of the module PCTL to the register PCR1, the multiplexer MUX4 is looped back to the register PCR2, and the multiplexer MUX5 sends the content of the register PCR1 at output of the module PCM2 and to the module PCTL where the program pointer PC is incremented. Conversely, when the signal PCS is on 1, the multiplexer MUX3 is looped back to the register PCR1, the multiplexer MUX4 sends the output of the module PCTL in the register PCR2, and the multiplexer MUX5 sends the content of the register PCR2 at output of the module PCM2 and to the module PCTL where the program pointer is incremented.

Figure 6:
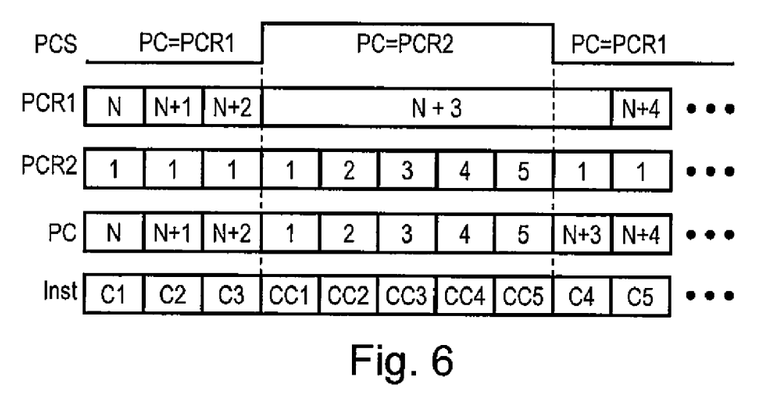
FIG. 6 shows in the form of timing diagrams, the operation of the integrated circuit represented in FIG. 4 according to one embodiment.

FIG. 6 shows the operation of one embodiment of the integrated circuit represented in FIG. 4, when the number of registers in the set of registers DTR is equal to 5. FIG. 6 represents the shape of the signal PCS, and the successive values of the registers PCR1, PCR2, of the program pointer PC and of the instruction code Inst transmitted to the unit CPU2 by the data bus DB.

The signal PCS is first of all on 0, while the program pointer PC stored in the register PCR1 which is sent on the address bus AB takes the successive values N, N+1, N+2, and while the content of the register PCR2 is kept on 1. The instruction codes read in the memory MEM at the addresses N, N+1, N+2 supplied by the program pointer PC are successively C1, C2, C3. The module DTM detects that the code C3 corresponds to a code triggering the sequencer SEQ2. The signal PCS then goes to 1, which locks the value of the register PCR1 on N+3. The value of the register PCR2 is then sent by the multiplexer MUX5 at input of the module PCTL where it is re-calculated (incremented by 1 in the example in the Figure) upon each read cycle of the memory MEM according to the instructions executed. The content of the register PCR2 which successively goes to 2, 3, 4, then 5, is sent on the bus AB to the sequencer SEQ2, where the address decoder ADDC successively reads the content of the registers in the set of registers DTR. The instruction codes CC1-CC5 of the hidden subprogram stored in the set of registers DTR are then successively read and transmitted to the unit CPU2. At the end of the reading of the last register DTn in the set of registers DTR, the address decoder ADDC sends a setting signal CE for the detection module DTM. The signal PCS then changes back to 0. The result is that the multiplexers MUX3, MUX5 send the output of the register PCR1, still kept on the value N+3, on the address bus AB and at input of the module PCTL, and that the register PCR2 is set to 1. The instruction code C4 at the address N+3 is then read in the memory MEM. Upon the next read cycle, the module PCTL increments the program pointer PC which then goes to the value N+4, triggering the reading of the next instruction code C5 in the memory MEM. The hidden subprogram stored in the set of registers does not necessarily occupy all the registers in the set of registers DTM. It is therefore advantageous for the signal PCS to be able to be reset to 0 when the last instruction code is read in the set of registers DTM. For this purpose, a control register can be provided for storing the number of registers DT1-DTn occupied by the hidden subprogram which is updated upon each write in the registers. The value of the counter CPT is continuously compared with that of the control register and when the counter exceeds the value of the control register, the setting signal CE is sent to the detection module DTM to control the reset to 0 of the signal PCS.

Figure 7:
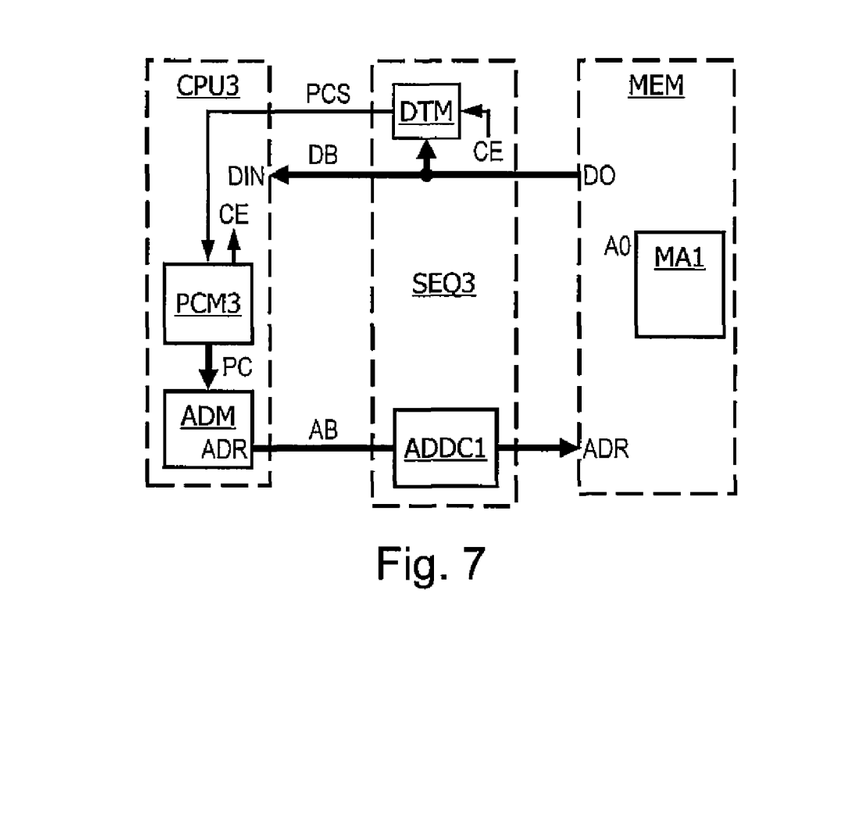
FIG. 7 represents in block form a third embodiment of an integrated circuit.

FIG. 7 represents another embodiment of the integrated circuit. The elements previously described are associated with the same references in FIG. 7. In this embodiment, the hidden subprogram is not stored in registers, but in a memory area MA1 of the space addressable by the processing unit, which can be located in the memory MEM or in another memory.

In FIG. 7, the integrated circuit comprises a processing unit CPU3 and a sequencer SEQ3 coupled between the unit CPU3 and the memory MEM. The unit CPU3 comprises a program pointer management module PCM3 supplying the address management module ADM with a program pointer PC. The module PCM3 is identical to the module PCM2 except that the register PCR2 is set to an address A0 of the memory area MA1 when the signal PCS is on 0. The sequencer SEQ3 comprises the detection module DTM and an address decoder ADDC1.

Figure 8:
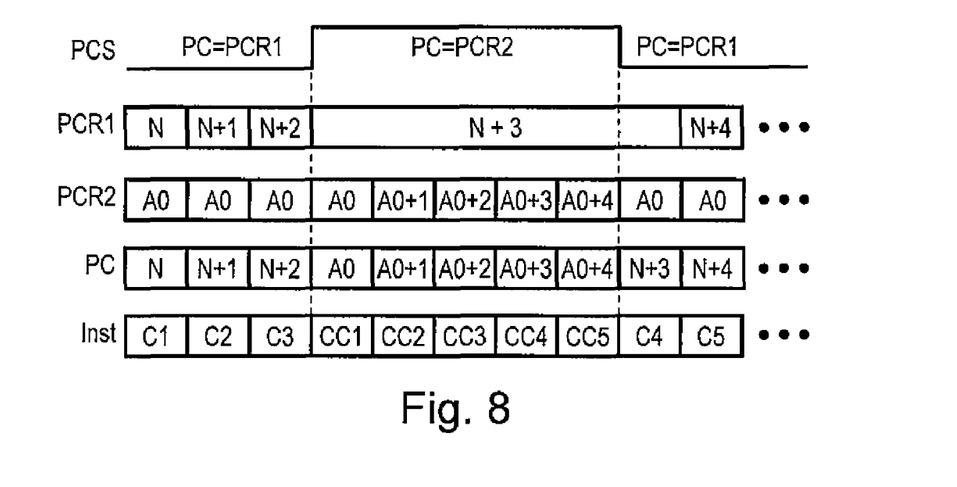
FIG. 8 shows in the form of timing diagrams, the operation of the integrated circuit represented in FIG. 7 according to one embodiment.

FIG. 8 shows the operation of one embodiment of the integrated circuit in FIG. 7 when the number of instruction codes of the hidden subprogram is equal to 5. FIG. 8 represents the shape of the signal PCS, and the successive values of the registers PCR1, PCR2, of the program pointer PC and of the instruction code Inst transmitted to the unit CPU3 by the data bus DB.

The signal PCS is first of all on 0, while the program pointer PC stored in the register PCR1 takes the successive values N, N+1, N+2, and while the content of the register PCR2 is kept on the value A0. The instruction codes read in the memory MEM are then successively C1, C2, C3. The module DTM detects that the code C3 corresponds to a code triggering the sequencer SEQ3. The signal PCS then goes to 1, which locks the value of the register PCR1 on N+3. The content of the register PCR2 is then sent by the multiplexer MUX5 at input of the module PCTL where it is incremented by 1 upon each read cycle of the memory. The content of the register PCR2 which thus goes successively to A0+1, A0+2, A0+3, then A0+4, is sent on the bus AB to the sequencer SEQ3, where the address decoder ADDC1 successively addresses the instruction codes of the hidden subprogram stored in the memory area MA1 to the addresses A0+1 to A0+4. The instruction codes CC1-CC5 of the hidden subprogram stored in the memory area MA1 are then successively read and transmitted to the unit CPU3. At the end of the reading of the memory area MA1, the signal PCS changes to 0. The multiplexer then selects the output of the register PCR1 still kept on the value N+3 which is sent on the address bus AB and at input of the module PCTL. The instruction code C4 at the address N+3 is then read in the memory MEM and the register PCR2 is set to the address A0. Upon the next read cycle, the module PCTL increments the program pointer PC which then goes to the value N+4, triggering the reading of the next instruction code C5 in the memory MEM.

The signal PCS can be reset to 0 by the module PCM2 which knows the start address A0 and the end address of the hidden subprogram. This operation can alternatively be performed by the module DTM after a predefined number of read cycles if the number of instructions codes in the sequence is set.

It shall be noted that FIGS. 3, 6 and 8 show the case of a purely sequential execution of the instruction codes of the hidden subprogram (the program counter PC is incremented by 1 upon each read cycle). The execution of the hidden subprogram, whether stored in the memory MEM or by the sequencer, may comprise conditional or unconditional jumps. Thus, certain instruction codes CC1-CC5 of the hidden subprogram may be executed several times by the processing unit or not be read, due to the presence of conditional jumps.

In the embodiments previously described, and in particular in the embodiment in FIG. 7, the signal PCS can alternatively be reset to 0 by the module DTM following the detection of an end code provided for that purpose at the end of the hidden subprogram.

Alternatively, a control register can be provided to store the number of read and executed instruction codes of the hidden subprogram. When the number of instruction codes read exceeds the value of the control register, the signal PCS is reset to 0.

The triggering code for triggering the sequencer SEQ1, SEQ2, SEQ3 stored in the register RG may be programmed in a non-modifiable manner at the time of manufacturing the integrated circuit or when the integrated circuit is adapted to a user.

Alternatively, the triggering code can be configurable by software, i.e., by the processing unit CPU1, CPU2, CPU3, upon the execution of the program stored in the memory MEM. In this case, the triggering code may be sent to the sequencer by the processing unit CPU1, CPU2, CPU3 in an enciphered form, and be deciphered by the sequencer before being written in the register RG. In this case, the sequencer SEQ1, SEQ2, SEQ3 comprises a deciphering module for deciphering the triggering code received from the processing unit before it is entered in the register RG.

In a similar manner, the hidden subprogram may be stored by the sequencer SEQ1, SEQ2 or in the memory area MA1 in a non-modifiable manner at the time of manufacturing the integrated circuit or when the integrated circuit is adapted to a user.

Alternatively, the hidden subprogram may also be configurable by software, i.e., by the processing unit CPU1, CPU2, CPU3, upon the execution of the program stored in the memory MEM. In this case, the instruction codes of the hidden subprogram may be transmitted on the bus DB to the sequencer SEQ1, SEQ2 or the memory area MA1 by the processing unit CPU1, CPU2, CPU3 in an enciphered form, and be deciphered by the sequencer before being stored in the set of registers DTR or in the memory area MA1.

In an embodiment, the triggering code on the one hand and on the other hand, the instruction codes of the hidden subprogram, are enciphered in different ways, for example using different encryption algorithms or using different secret keys. Thus, knowledge of the triggering code of the sequencer stored in the register RG does not favor the discovery of the instruction codes of the hidden subprogram stored in the set of registers DTR or in the memory area MA1.

When the hidden subprogram is stored in an external memory (case in FIG. 7), it is also possible to consider the instruction codes of the hidden subprogram being stored in enciphered form and being deciphered at the time they are read in the memory. The sequencer SEQ3 then comprises a deciphering module which deciphers each code read in the memory area MA1 before sending it on the data bus DB to the processing unit CPU3.

Furthermore, the instruction code corresponding to the triggering code may not be executed, or be executed by the processing unit, either before, or after the execution of the hidden subprogram.

In the above described embodiments of the sequencer, a deactivation function for deactivating the sequencer may also be considered, particularly so as to enable the processing unit to execute the triggering code of the sequencer like an instruction code without triggering the sequencer. This deactivation function can be produced by any means such as a write in a register, or by first locating the memory addresses where the codes which to be processed like a sequencer triggering code are located.

The integrated circuit may comprise several sequencers, each sequencer being triggered by a code specific to it. This arrangement enables several distinct hidden subprograms to be triggered, each hidden subprogram having its own triggering code. Providing several sequencers is useful particularly when the sequencer is not configurable. Instead of duplicating the sequencers, one embodiment provides a single sequencer comprising a larger set of registers or several banks of registers, and provides a detection module capable of detecting several triggering codes and of activating one or other of the banks of registers according to the value of the detected triggering code.

Various alternative embodiments are possible. In particular, the embodiments are not limited to a triggering code for triggering the sequencer corresponding to an instruction or an instruction code executable by the processing unit. The triggering code can also be a sequence of instruction codes, particularly so as to avoid instruction codes read in the memory and to be executed by the processing unit corresponding by chance to the triggering code. Generally speaking, the triggering code is chosen so as not to appear in the program executed by the processing unit and is added to this program in a timely manner in the sequence of operations performed by the execution of the program.

If the sequencer triggering code is an instruction or a sequence of instructions executed by the processing unit, it may also be chosen equal to the instruction or the sequence of instructions located in the program at the location corresponding to the moment at which the hidden sequence of instructions are to be executed.

If the sequencer triggering code is an instruction or a sequence of instructions executed by the processing unit, the instruction or the sequence of instructions may in one embodiment be chosen so as not to affect the progress of the program and the operations it performs.

The embodiments are not limited either to the detection of a triggering code in the instructions that are read in the program memory during the execution of a program. Any other event capable of being detected during the execution of the program may also be used to trigger the hidden subprogram. Thus, the triggering code may be detected on a bus other than the data bus DB, such as the address bus AB. In this case, the detection module is coupled to the address bus. Thus, the hidden program can be triggered following the detection of a specific address on the address bus for example when the program memory is read.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method for executing by a processing unit a program stored in a memory, the method comprising:
executing instructions of the program by the processing unit;
storing a triggering code in a register;
during each execution of an instruction of the program by the processing unit, detecting a code and comparing the code detected with the triggering code stored in the register;
if the code detected is equal to the triggering code, triggering execution of a hidden subprogram by the processing unit;
storing the hidden subprogram in internal registers;
successively addressing each of said internal registers using a counter coupled to said internal registers;
providing a signal, from a detection module having an input terminal coupled to said memory, to:
a control terminal of a multiplexer having a first input terminal configured to be coupled to said memory, a second input terminal coupled to said internal registers, and an output terminal coupled to said processing unit, and a control terminal;
said counter to trigger said counter; and
a program pointer of said processing unit.

2. The method of claim 1 wherein the code detected includes a datum circulating on a bus.

3. The method of claim 2 wherein the triggering code stored in the register can be modified by the processing unit.

4. The method of claim 3 wherein the hidden subprogram can be modified by the processing unit.

5. The method of claim 1 wherein the triggering code to be stored in the register is sent by the processing unit in an enciphered form, is deciphered, and is then stored in the register.

6. The method of claim 1 wherein the hidden subprogram is transmitted by the processing unit in an enciphered form, is deciphered, and then stored for execution by the processing unit.

7. The method of claim 1 wherein the hidden subprogram is transmitted by the processing unit in an enciphered form, then stored for execution by the processing unit, and deciphered when it is executed.

8. The method of claim 1 wherein the triggering code and the hidden subprogram are deciphered in different ways.

9. The method of claim 1 wherein the hidden subprogram is stored in the memory.

10. The method of claim 1 wherein the code detected is a read address for reading the memory, sent by the processing unit.

11. The method of claim 1 wherein the triggering code belongs to the set of instructions executable by the processing unit.

12. The method of claim 1 wherein an instruction read in the memory and which corresponds to the triggering code is executed before or after the hidden subprogram.

13. The method of claim 1, further comprising keeping a program pointer at a value unchanged during the execution of the hidden subprogram.

14. An integrated circuit, comprising:
a processing unit configured to be linked to a memory and configured to read and execute each instruction of a program stored in the memory;
a register for storing a triggering code; and
a sequencing module configured to:
detect a code during each execution of an instruction of the program by the processing unit and compare the code detected with the triggering code stored in the register; and
if the code detected is equal to the triggering code stored in the register, transmit to the processing unit for execution each instruction of a hidden subprogram, wherein the sequencing module includes:
a set of registers to store the hidden subprogram;
an address decoder coupled to said set of registers and configured to address said set of registers according to an address provided by said processing unit;
a multiplexer having a first input terminal configured to be coupled to said memory, a second input terminal coupled to said set of registers, an output terminal coupled to said processor unit, and a control terminal; and
a detection module having an input terminal configured to be coupled to said memory and an output terminal coupled to provide a signal: (a) to said control terminal of said multiplexer, (b) to trigger said address decoder, and (c) to a program pointer of said processing unit.

15. The integrated circuit of claim 14 wherein the code detected to trigger the hidden subprogram includes a datum circulating on a bus.

16. The integrated circuit of claim 15 wherein the register to store the triggering code can be modified by the processing unit.

17. The integrated circuit of claim 14 wherein the sequencing module is configured to read the hidden subprogram in the memory.

18. The integrated circuit of claim 14 wherein the code detected is a read address to read the memory sent by the processing unit.

19. The integrated circuit of claim 14 wherein the triggering code belongs to a set of instructions executable by the processing unit.

20. The integrated circuit of claim 14 wherein the sequencing module is configured to decipher the triggering code received from the processing unit and to store said information in the register in a deciphered form.

21. The integrated circuit of claim 14 wherein the sequencing module is configured to decipher the hidden subprogram, received from the processing unit, and to store the subprogram in a deciphered form.

22. The integrated circuit of claim 14 wherein the sequencing module is configured to decipher the triggering code and the hidden subprogram in different ways.

23. The integrated circuit of claim 14 wherein the sequencing module is configured to decipher each instruction of the hidden subprogram stored in an enciphered form before transmission of the instruction to the processing unit for execution.

24. The integrated circuit of claim 23 wherein the triggering code belongs to a set of instructions executable by the processing unit.

25. The integrated circuit of claim 14 wherein the sequencing module is configured to transmit to the processing unit an intercepted instruction code which corresponds to the triggering code before or after the instructions of the hidden subprogram.

26. The integrated circuit of claim 14 wherein the processing unit is configured to keep a program pointer at a value unchanged during the execution of the hidden subprogram.

27. The integrated circuit of claim 14, further comprising several sequencing modules to execute several hidden subprograms.

28. An apparatus, comprising:
a memory adapted to store a first program having instructions;
a processor unit coupled to said memory and adapted to read and execute instructions of said stored first program;
a register for storing a triggering code; and
a sequencer coupled to said memory, said register and said processor unit, said sequencer being configured to detect a code during execution of said first program by the processor unit, to compare the code detected with the triggering code stored in the register, and to transmit for execution by the processor unit each instruction of a second program if the code detected is equal to the triggering code stored in the register,
wherein said second program is a hidden program such that if said first program is extracted from said memory and attempted to be executed by a non-secured processor unit, said first program will not be executable by said non-secured processor since said hidden program is inaccessible to said non-secured processor, wherein said sequencer includes:
a plurality of storage units adapted to store said hidden program;
a counter coupled to said storage unit and adapted to successively address each of said storage units;
a multiplexer having a first input terminal coupled to said memory, a second input terminal coupled to said storage units, an output terminal coupled to said processor unit, and a control terminal; and
a detection module having an input terminal coupled to said memory and an output terminal coupled to provide a signal: (a) to said control terminal of said multiplexer, (b) to trigger said counter, and (c) to a program pointer of said processor unit.

29. The apparatus of claim 28 wherein said memory, processor unit, and sequencer form parts of an integrated circuit card.

30. The apparatus of claim 28 wherein said code detected includes a datum circulating on a bus.

31. The apparatus of claim 28 wherein said triggering code belongs to a set of said instructions of said first program.

32. An apparatus, comprising:
a memory adapted to store a first program having instructions;
a processor unit coupled to said memory and adapted to read and execute instructions of said stored first program;
a register for storing a triggering code; and
a sequencer coupled to said memory, said register and said processor unit, said sequencer being configured to detect a code during execution of said first program by the processor unit, to compare the code detected with the triggering code stored in the register, and to transmit execution by the processor unit each instruction of a second program if the code detected is equal to the triggering code stored in the register,
wherein said second program is a hidden program such that if said first program is extracted from said memory and attempted to be executed by a non-secured processor unit, said first program will not be executable by said non-secured processor since said hidden program is inaccessible to said non-secured processor, wherein said sequencer includes:
a plurality of storage units adapted to store said hidden program;
an address decoder coupled to said storage unit and adapted to address said storage units according to an address provided by said processor unit;
a multiplexer having a first input terminal coupled to said memory, a second input terminal coupled to said storage units, an output terminal coupled to said processor unit, and a control terminal; and
a detection module having an input terminal coupled to said memory and an output terminal coupled to provide a signal: (a) to said control terminal of said multiplexer, (b) to trigger said address decoder, and (c) to a program pointer of said processor unit.

33. An apparatus, comprising:
a memory adapted to store a first program having instructions;
a processor unit coupled to said memory and adapted to read and execute each instruction of said stored first program; and
a sequencer coupled to said memory and said processor unit, said sequencer being adapted to detect a piece of information during execution of said first program by the processor unit, and being further adapted to trigger execution of a second program by the processor unit if said information is detected,
wherein said second program is a hidden program such that if said first program is extracted from said memory and attempted to be executed by a non-secured processor unit, said first program will not be executable by said non-secured processor since said hidden program is inaccessible to said non-secured processor, and
wherein said sequencer includes:
a plurality of storage units adapted to store said hidden program;
a counter coupled to said storage unit and adapted to successively address each of said storage units;
a multiplexer having a first input terminal coupled to said memory, a second input terminal coupled to said storage units, an output terminal coupled to said processor unit, and a control terminal; and
a detection module having an input terminal coupled to said memory and an output terminal coupled to provide a signal: (a) to said control terminal of said multiplexer, (b) to trigger said counter, and (c) to a program pointer of said processor unit.

34. The apparatus of claim 33 wherein said memory, processor unit, and sequencer form parts of an integrated circuit card.

35. The apparatus of claim 33 wherein said information belongs to a set of said instructions of said first program.

36. An apparatus, comprising:
a memory adapted to store a first program having instructions;
a processor unit coupled to said memory and adapted to read and execute each instruction of said stored first program; and
a sequencer coupled to said memory and said processor unit, said sequencer being adapted to detect a piece of information during execution of said first program by the processor unit, and being further adapted to trigger execution of a second program by the processor unit if said information is detected,
wherein said second program is a hidden program such that if said first program is extracted from said memory and attempted to be executed by a non-secured processor unit, said first program will not be executable by said non-secured processor since said hidden program is inaccessible to said non-secured processor, and
wherein said sequencer includes:
a plurality of storage units adapted to store said hidden program;
an address decoder coupled to said storage unit and adapted to address said storage units according to an address provided by said processor unit;
a multiplexer having a first input terminal coupled to said memory, a second input terminal coupled to said storage units, an output terminal coupled to said processor unit, and a control terminal; and
a detection module having an input terminal coupled to said memory and an output terminal coupled to provide a signal: (a) to said control terminal of said multiplexer, (b) to trigger said address decoder, and (c) to a program pointer of said processor unit.

37. The apparatus of claim 36 wherein said information belongs to a set of said instructions of said first program.

* * * * *

UNITED STATES PATENT AND TRADEMARK OFFICE
CERTIFICATE OF CORRECTION

PATENT NO.        : 8,127,120 B2
APPLICATION NO.   : 12/108443
DATED             : February 28, 2012
INVENTOR(S)       : Philippe Roquelaure It is certified that error appears in the above-identified patent and that said Letters Patent is hereby corrected as shown below:

Column 13, Lines 21-22:
"triggering code stored in the register, and to transmit execution by the processor unit" should read,
--triggering code stored in the register, and to transmit for execution by the processor unit--.

Signed and Sealed this
Fifteenth Day of May, 2012

David J. Kappos
*Director of the United States Patent and Trademark Office*